United States Patent
Foladare et al.

(10) Patent No.: US 6,353,662 B1
(45) Date of Patent: Mar. 5, 2002

(54) METHOD AND APPARATUS FOR ELIMINATING NUISANCE SIGNALS IN MULTI-PARTY CALLS

(75) Inventors: Mark Jeffrey Foladare, Kendall Park; Randy G. Goldberg, Princeton; Shelley B. Goldman, East Brunswick; Peter Kapsales, Holmdel; Amir M. Mane, Lincroft, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/953,627

(22) Filed: Oct. 17, 1997

(51) Int. Cl.⁷ .............................................. H04M 11/00
(52) U.S. Cl. ............................ 379/101.01; 379/102.01; 379/162
(58) Field of Search .................. 379/399, 406, 379/407, 162, 163, 165, 158, 157, 102.01, 102.02, 102.03, 101.01, 93.13

(56) References Cited

U.S. PATENT DOCUMENTS 4,577,067 A * 3/1986 Levy et al. ............ 379/101.01
5,907,600 A * 5/1999 Fuller et al. ............. 379/93.01

OTHER PUBLICATIONS

Riek, Lance; Morgan, David; Bardsley, David: "Speech/Non–Speech Signal Separation", Voice Communications Initiative: Sanders, A Lockheed Company: Technical Report VCI–3 (Jan. 1990).

* cited by examiner

Primary Examiner—Stella Woo
(74) Attorney, Agent, or Firm—Kenyon & Kenyon

(57) ABSTRACT

A method and apparatus for selectively eliminating nuisance signals during communications connections as during conference calling in which the signals are eliminated when a call path is placed on hold by monitoring signals in a reverse traffic channel from a holding party. If the reverse traffic channel contains a predetermined signal, a music on hold circuit is disabled. When the call is first placed on hold, a check for the predetermined signal is made. If the predetermined signal is not detected during a defined period of time, the music on hold circuit is engaged; otherwise the circuit remains disabled. The predetermined signal may be noise signals, speech signals or a sequence of touch tones or speech representing a command to disable the music on hold circuit. Optionally, a disabled music on hold circuit may be enabled by placing a second command signal, such as speech or touch tones, into the reverse traffic channel.

61 Claims, 2 Drawing Sheets

METHOD AND APPARATUS FOR ELIMINATING NUISANCE SIGNALS IN MULTI-PARTY CALLS

BACKGROUND OF THE INVENTION

The present invention relates to a method and apparatus for eliminating nuisance signals in multi-party calls.

Multi-party communication is a conventional feature in communications systems. Known as "conference calls," such multi-party communication establishes call paths among a plurality of subscribers rather than traditional two-party communications. As is known, conference calls may be established by a communications network, such as the Public Switched Telephone Network ("PSTN"). Each party to the call joins the call by generating a call request message accessing a predetermined network address within the communication network. The network contains switches and processors that route communications data from one party to the other parties to the call.

Progress of conference calls may be interrupted unintentionally by telecommunications equipment that possess "music on hold" features. If one party to the conference call places the call on hold, the equipment may engage a music on hold circuit that introduces a nuisance signal such as music, broadcast radio, audio advertising or other signals to the conference call. The nuisance signal disrupts the progress of the call.

Accordingly, there is a need in the art for a method and apparatus for eliminating nuisance signals generated by music on hold PBXs during multi-party calls.

SUMMARY OF THE INVENTION

Embodiments of the present invention include a method and apparatus that selectively disable music on hold signals based upon signal activity of the holding party or parties to the call. When a call path is placed on hold, communications equipment monitors signals placed in a reverse traffic channel by the holding party or parties. If the reverse traffic channel contains a predetermined signal, the communications equipment disables its music on hold circuit. The predetermined signal may be one meeting or exceeding a predetermined amplitude, a speech signal or a sequence of touch tones or speech representing a command to disable the music on hold circuit.

DETAILED DESCRIPTION OF THE PRESENT INVENTION

Figure 1:
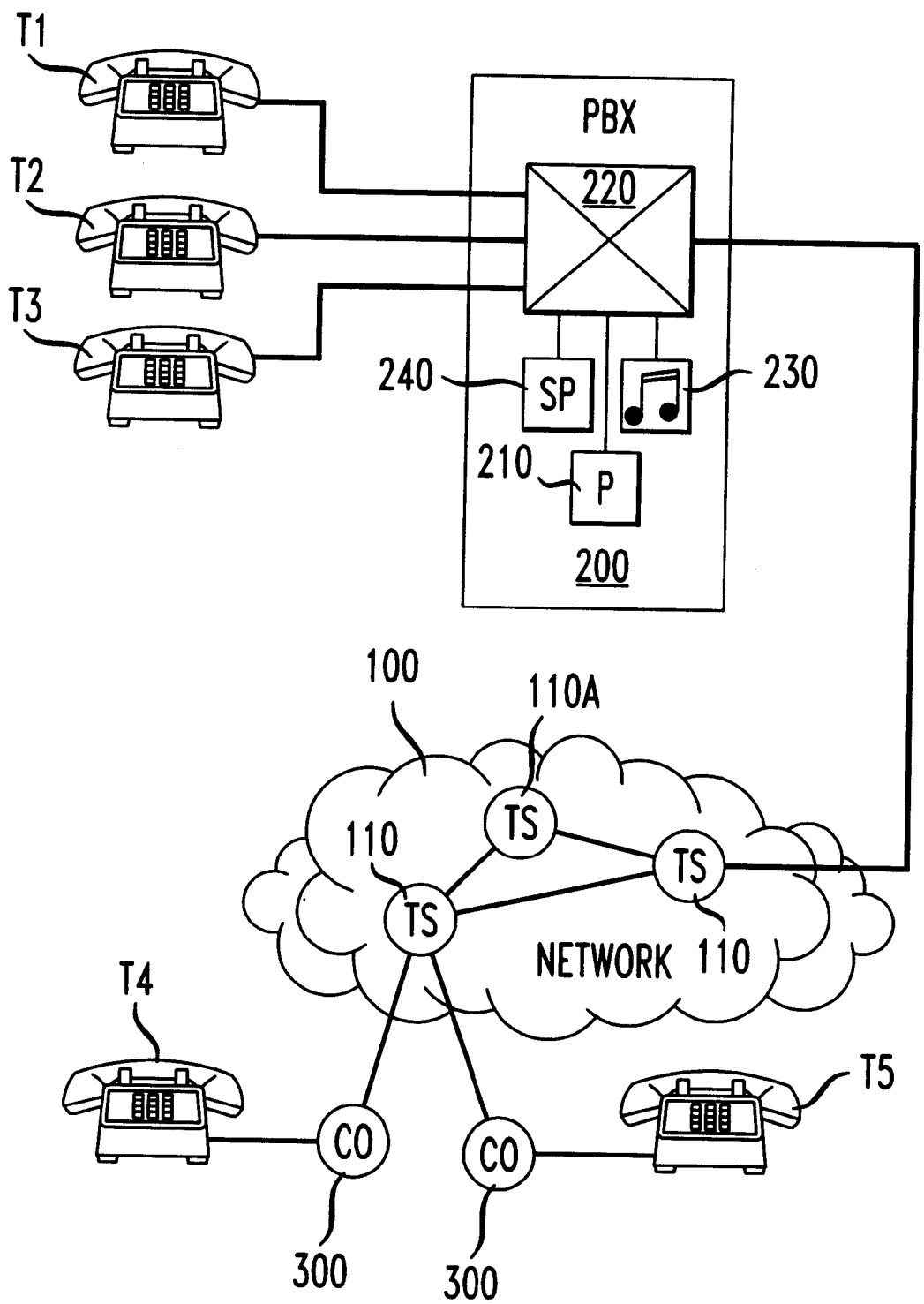
FIG. 1 is a block diagram of a communications system constructed in accordance with the present invention.

Turning to FIG. 1, there is shown a communications system constructed in accordance with the present invention. A communications network 100 is populated by a number of communication switches 110. The switches are interconnected by trunk lines. Telephone equipment communicates with the network 100 through a private branch exchanges ("PBX") 200, central offices 300 or other conventional communications equipment. In the illustrated embodiment, telephones T1–T3 are shown connected to the communication network 100 through a PBX 200; telephones T4 and T5 are connected to the communication network through separate central offices 300. Each switch is associated with a processor (not shown); similarly each PBX 200 (or central office 300) has an associated processor 210 in communication with a switch matrix 220. The switch matrix 220 establishes connections between the telephone equipment T1–T3 to the network 100.

In this embodiment, a switch 110 in the communications network 100 establishes the conference calls. To join a conference call, a party at T1 dials a network address identifying the conference call. The PBX 200 interprets the dialed digits and signals the communications network 100 according to conventional procedures. The communications network 100 and the PBX 200 may exchange additional signaling to establish a call path between subscriber T1 and the switch that administers the conference call, say switch 110A.

Each call path extending from a party to its destination is associated with two traffic channels. A "forward traffic channel" contains data generated by a party to be transmitted to the destination(s). A "reverse traffic channel" contains data transmitted through the call path and delivered to the party. These traffic channels are labeled as determined from the perspective of the telephone T1 serviced by the source of the nuisance signals, such as PBX 200. From T1's perspective, T1's forward traffic channel outbound data to be delivered to the destination(s). Similarly, from T1's perspective, the reverse traffic channel contains a signal inbound from the communication network to be delivered to telephone T1.

The inventive nuisance elimination feature is described as applied to PBX 200 that includes a "music on hold" feature. Such a PBX will include a conventional music on hold circuit 230 that is engaged by processor 210. As the terminology is used herein, a "music on hold circuit" includes any of the known devices in communications equipment that introduce music, broadcast radio, advertising or other signals to a party waiting on hold. Examples of such a PBX include the Definity PBX System, available from Lucent Technologies of Murray Hill, N.J.

When a PBX places a call on "hold", a PBX switch matrix 220 disconnects a telephone from the call path but does not terminate the call. The remainder of the call path remains active. Consider, as an example, a call path that extends from telephone T1 through the switch matrix 220, the communication network 100 and the central office 300, to telephone T5. When T1 places the call on hold, the switch matrix 220 disconnects T1 from the call path. However, the switch matrix 220 maintains the call path active from itself through to telephone T5. The switch matrix 220 receives data in a reverse traffic channel from T5. Thus, the PBX 200 may monitor speech and signals generated by a party at telephone T5. It may place data generated by a music on hold circuit 230 in a forward traffic channel to T5.

Once telephone T5 is placed on hold, telephone T1 may answer or establish another call in another call path through the PBX 200. T1 also may rejoin the call path with telephone T5.

Figure 2:
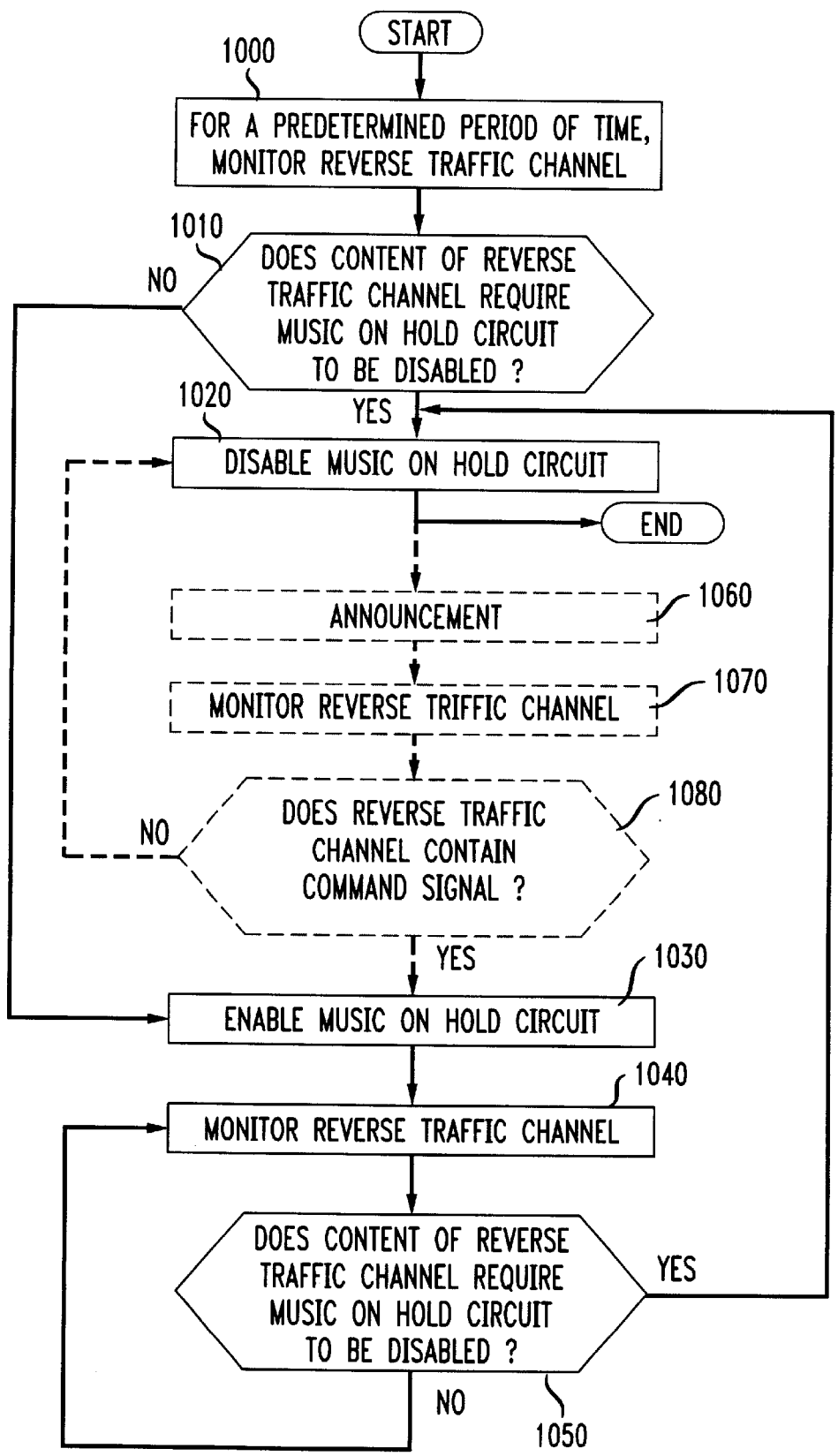
FIG. 2 is a flow diagram illustrating operations performed by communications equipment according to the present invention.

FIG. 2 illustrates operations performed by the PBX processor 210 as dictated by software or firmware resident thereon. When the PBX 200 places a call on hold, the nuisance elimination feature does not engage the music on hold circuit 230 immediately as may be done by conventional PBX's. Instead, as shown in FIG. 2, the PBX 200 monitors the reverse traffic channel, inbound to the PBX from the communication network 100, for a predetermined period of time (Step 1000). The period may be, for example, five seconds. The PBX 200 determines whether signal content of the reverse traffic channel requires the PBX 200 to continue to disable the music on hold circuit 230. (Step 1010). If so, the PBX 200 maintains the music on hold circuit 230 disabled (Step 1020).

If not, the PBX 200 enables the music on hold circuit 230 (Step 1030). Optionally, the PBX 200 continues to monitor the reverse traffic channel (Step 1040) to determine whether the signal content of the reverse traffic channel requires the PBX 200 to disable the music on hold circuit 230 (Step 1050). If so, the PBX 200 disables it (Step 1020). Once the music on hold circuit 230 is disabled at step 1020, the processor 210 may maintain the music on hold circuit 230 disabled until telephone T1 releases the call from the on hold state. The nuisance elimination method of FIG. 2 is discontinued whenever equipment T1 releases the call path from its on hold state.

The nuisance elimination method of FIG. 2 is described above as operable on PBX 200; however, it finds application in a central office 300 or any other communications equipment that introduces music or other signals to a call path when the call is placed on hold. For example, the nuisance elimination feature may be integrated into the Infinity Conversant system or the Merlin II communication system, each commercially available from Lucent Technologies. Also, the present invention may be integrated into a family of computer telephone interfaces, such as those manufactured by the Dialogic Corporation, Parsippany, N.J., as model nos. D-240SC-T1, D-41D, D-41ESC and D-121A. While it is unlikely that a switch within the network will provide a "music on hold" feature as found in many commercially available PBX's, the nuisance elimination method of FIG. 2 finds application in such switches to eliminate any music or other nuisance signal generated thereby.

The PBX 200 may be programmed to recognize different signals as the signals that require the music on hold circuit to be disabled. In a first embodiment, the PBX 200 may monitor the reverse traffic channel for any signal having activity meeting or exceeding a predetermined signal threshold. To determine the level of activity present in the PBX 200, the PBX processor 210 adds the values of digital data contained in each sample of the various traffic channel received in a measurement window. The window may last for 10 msec, for example. The PBX then divides by the number of samples received. The result represents the average energy contained in the reverse traffic channel during the measurement window and is compared against a triggering threshold. In this embodiment, any signal, including noise, generated on the reverse traffic channel that exceeds the threshold causes the PBX 200 to disable the music on hold circuit 230.

In a second embodiment, the PBX may monitor the reverse traffic channel to detect a command signal therein. The command signal may be a predetermined sequence of dual tone multi-frequency ("TDMF") tones, such as "*89" that is entered in by a party to the call at the party's telephone, T5 for example. When the PBX 200 detects the command signal, the PBX 200 disables the music on hold circuit 230. Alternatively, the command signal may be a spoken command, speech or a sequence of speech, which may be detected by a speech processor 240, a speech recognition software contained in PBX processor 210 or speech recognition software contained within a processor networked to the PBX processor 210 (not shown).

In a third embodiment, the PBX 200 may be provided with a speech processor 240. The PBX 200 may monitor the reverse traffic channel for a speech signal. When the reverse traffic channel contains a speech signal, the PBX 200 disables the music on hold circuit 230. However, the PBX 200 would not disable the circuit if it detected non-speech signals in the reverse traffic channel, such as background noise introduced by telephone equipment of another party to the call.

Optionally, the nuisance elimination method of FIG. 2 may include a step of, once the music on hold circuit has been disabled, announcing that the music has been discontinued and, again optionally, inviting the party to resume the music on hold circuit by generating another predetermined signal (Step 1060). The PBX 200 then monitors the reverse traffic channel (Step 1070) to determine if reverse traffic channel contains the second signal (Step 1080). Again, the second signal may be a signal meeting or exceeding a predetermined amplitude, a DTMF tone signal or a speech signal. If the channel contains such a signal, the processor 210 advances to step 1030 and enables the music on hold circuit. Otherwise, the processor 210 returns to step 1060.

We claim:

1. A method of eliminating nuisance signals from a call path that has been placed on hold, comprising the steps of:
    monitoring a reverse traffic channel of the call path,
    determining whether an energy level of a signal in the reverse traffic channel exceeds a predetermined threshold, and
    when the energy level exceeds the threshold, disabling the nuisance signals.

2. The method of claim 1, wherein the signal contains a speech signal.

3. The method of claim 1, wherein the reverse traffic channel is input to a private branch exchange.

4. The method of claim 1, wherein the reverse traffic channel is input to a central office.

5. The method of claim 1, wherein the monitoring and determining steps are discontinued when the call path is released from the on hold state.

6. In a communication apparatus comprising a switch matrix that routes a reverse traffic channel through a call path to telephone equipment, and a music on hold circuit that generates signals on a forward traffic channel of the call path when the call path is placed on hold, an apparatus that selectively eliminates the signals, comprising a processor in communication with the switch matrix, wherein the processor:
    monitors the reverse traffic channel,
    determines whether the reverse traffic channel contains a signal,
    compares the signal to a predetermined threshold of activity, and
    when the reverse traffic channel signal exceeds the predetermined threshold, disables the music on hold circuit.

7. The apparatus of claim 6, wherein the signal is a speech signal.

8. The apparatus of claim 6, wherein the communication apparatus is a private branch exchange.

9. The apparatus of claim 6, wherein the communication apparatus is a central office.

10. The apparatus of claim 6, wherein processor discontinues the monitoring and determining operation when the call path is released from the on hold state.

11. A method of managing nuisance signals in a call path that has been placed on hold, comprising the steps of:
    monitoring a reverse traffic channel of the call path for a predetermined period of time before the nuisance signals are enabled, determining whether a threshold noise level is met in the reverse traffic channel during the period, and when the period expires without meeting the threshold noise level in the reverse traffic channel, enabling the nuisance signals.

12. The method of claim 11, wherein the threshold noise level comprises a signal having a predetermined level of activity.

13. The method of claim 11, wherein the threshold noise level comprises a touch tone command.

14. The method of claim 11, wherein the threshold noise level comprises a sequence of telephone touch tones.

15. The method of claim 11, wherein the threshold noise level comprises an utterance of speech.

16. The method of claim 11, wherein the threshold noise level comprises a sequence of speech.

17. The method of claim 11, wherein the reverse traffic channel is input to a private branch exchange.

18. The method of claim 11, wherein the reverse traffic channel is input to a central office.

19. The method of claim 11, wherein the monitoring and determining step are discontinued when the call path is released from the on hold state.

20. A method of managing nuisance signals in a call path that has been placed on hold, comprising the steps of:

monitoring a reverse traffic channel of the call path for a predetermined period of time before the nuisance signals are enabled, determining whether a signal level of the reverse traffic channel exceeds a predetermined threshold during the period, and when the period expires without exceeding the signal threshold in the reverse traffic channel, enabling the nuisance signals, subsequent to the enabling step:
monitoring the reverse traffic channel,
determining whether the signal threshold is met in the reverse traffic channel, and
when the signal threshold is met in the reverse traffic channel, disabling the nuisance signals.

21. The method of claim 20, wherein the signal is a speech signal.

22. The method of claim 20, wherein the signal is a touch tone command.

23. The method of claim 20, wherein the signal is a sequence of telephone touch tones.

24. The method of claim 20, wherein the signal is an utterance of speech.

25. The method of claim 20, wherein the signal is a sequence of speech.

26. The method of claim 20, wherein the reverse traffic channel is input to a private branch exchange.

27. The method of claim 20, wherein the reverse traffic channel is input to a central office.

28. The method of claim 20, wherein the monitoring and determining steps are discontinued when the call path is released from the on hold state.

29. A method of managing nuisance signals in a call path that has been placed on hold, comprising the steps of:

monitoring a reverse traffic channel of the call path for a predetermined period of time before the nuisance signals are enabled, determining whether any signal is contained in the reverse traffic channel during the period, when the period expires without having the signal appear in the reverse traffic channel, enabling the nuisance signals, subsequent to the enabling step:
monitoring the reverse traffic channel,
determining whether the signal is contained in the reverse traffic channel, and
when the signal is contained in the reverse traffic channel, disabling the nuisance signals, subsequent to the disabling step:
monitoring the reverse traffic channel,
determining whether a predetermined signal is contained in the reverse traffic channel, and
when the predetermined signal is contained in the reverse traffic channel, enabling the nuisance signal.

30. The method of claim 29, wherein the signal is a signal having a predetermined level of activity.

31. The method of claim 29, wherein the signal is a speech signal.

32. The method of claim 29, wherein the signal is a touch tone command.

33. The method of claim 29, wherein the signal is a sequence of telephone touch tones.

34. The method of claim 29, wherein the signal is an utterance of speech.

35. The method of claim 29, wherein the signal is a sequence of speech.

36. The method of claim 29, wherein the predetermined signal is a signal having a predetermined level of activity.

37. The method of claim 29, wherein the predetermined signal is a touch tone command.

38. The method of claim 29, wherein the predetermined signal is a sequence of telephone touch tones.

39. The method of claim 29, wherein the predetermined signal is an utterance of speech.

40. The method of claim 29, wherein the predetermined signal is a sequence of speech.

41. The method of claim 29, wherein the reverse traffic channel is input to a private branch exchange.

42. The method of claim 29, wherein the reverse traffic channel is input to a central office.

43. The method of claim 29, wherein the monitoring and determining step are discontinued when the call path is released from the on hold state.

44. In a communication apparatus comprising a switch matrix that routes a reverse traffic channel through a call path to telephone equipment, and a music on hold circuit that generates signals on a forward traffic channel of the call path when the telephone equipment places the call path on hold, an apparatus that manages the music on hold circuit, comprising a processor in communication with the switch matrix and the music on hold circuit, wherein the processor:

monitoring a reverse traffic channel of the call path for a predetermined period of time before the nuisance signals are enabled, determines whether any signal is contained in the reverse traffic channel during the period, and when the period expires without having the signal appear in the reverse traffic channel, enables the music on hold circuit.

45. In a communication apparatus comprising a switch matrix that routes a reverse traffic channel through a call path to telephone equipment, and a music on hold circuit that generates signals on a forward traffic channel of the call path when the telephone equipment places the call path on hold, an apparatus that selectively eliminates the signals, comprising a processor in communication with the switch matrix and the music on hold circuit, wherein the processor:

monitoring a reverse traffic channel of the call path for a predetermined period of time before the nuisance signals are enabled, determines whether any signal is contained in the reverse traffic channel during the period, and when the period expires without having the signal appear in the reverse traffic channel, enables the music on hold circuit;

wherein, subsequent enabling the music on hold circuit, the processor further:

monitors the reverse traffic channel, determines whether the signal is contained in the reverse traffic channel, and when the signal is contained in the reverse traffic channel, disables the music on hold circuit.

46. In a communication apparatus comprising a switch matrix that routes a reverse traffic channel through a call path to telephone equipment, and a music on hold circuit that generates signals on a forward traffic channel of the call path when the telephone equipment places the call path on hold, an apparatus that selectively eliminates the signals, comprising a processor in communication with the switch matrix and the music on hold circuit, wherein the processor:

monitoring a reverse traffic channel of the call path for a predetermined period of time before the nuisance signals are enabled;

determines whether any signal is contained in the reverse traffic channel during the period;

when the period expires without having the signal appear in the reverse traffic channel, enables the music on hold circuit;

wherein, subsequent to enabling the music on hold circuit, the processor further:

monitors the reverse traffic channel, determines whether the signal is contained in the reverse traffic channel, and when the signal is contained in the reverse traffic channel, disables the music on hold circuit;

wherein, subsequent to disabling the music on hold circuit, the processor further:

monitors the reverse traffic channel, determines whether a predetermined signal is contained in the reverse traffic channel, and when the predetermined signal is contained in the reverse traffic channel, enables the music on hold circuit.

47. A method of eliminating nuisance signals from a call path that has been placed on hold, comprising the steps of:

monitoring a reverse traffic channel of the call path, detecting a presence of a non-command signal in the reverse traffic channel, and when the reverse traffic channel contains the non-command signal, disabling the nuisance signals.

48. The method of claim 47, wherein the non-command signal has a predetermined level of activity.

49. The method of claim 47, wherein the non-command signal is an utterance of speech.

50. The method of claim 47, wherein the non-command signal is a sequence of speech.

51. The method of claim 47, wherein the reverse traffic channel is input to a private branch exchange.

52. The method of claim 47, wherein the reverse traffic channel is input to a central office.

53. The method of claim 47, wherein the monitoring and detecting steps are discontinued when the call path is released from the on hold state.

54. In a communication apparatus comprising a switch matrix that routes a reverse traffic channel through a call path to telephone equipment, and a music on hold circuit that generates signals on a forward traffic channel of the call path when the call path is placed on hold, an apparatus that selectively eliminates the signals, comprising a processor in communication with the switch matrix, wherein the processor:

monitors the reverse traffic channel detects a presence of a non-command signal in the reverse traffic channel, and when the reverse traffic channel contains the non-command signal, disables the nuisance signals.

55. The apparatus of claim 54, wherein the non-command signal has a predetermined level of activity.

56. The apparatus of claim 54, wherein the non-command signal is an utterance of speech.

57. The method of claim 54, wherein the non-command signal is a sequence of speech.

58. The apparatus of claim 54, wherein the communication apparatus is a private branch exchange.

59. The apparatus of claim 54, wherein the communication apparatus is a central office.

60. The apparatus of claim 54, wherein processor discontinues the monitoring and detecting operation when the call path is released from the on hold state.

61. A method of managing nuisance signals in a call path that has been placed on hold, comprising the steps of:

monitoring a reverse traffic channel of the call path for a predetermined period of time, determining whether a non-command signal is contained in the reverse traffic channel during the period, when the period expires without having the non-command signal in the reverse traffic channel, enabling the nuisance signals, subsequent to the enabling step:

monitoring the reverse traffic channel, detecting the presence of speech in the reverse traffic channel, and when speech is detected in the reverse traffic channel, disabling the nuisance signals, subsequent to the disabling step:

monitoring the reverse traffic channel, determining whether a signal meets predetermined level of activity in the reverse traffic channel, and when the signal falls below a predetermined level of activity in the reverse traffic channel, enabling the nuisance signal.

* * * * *